United States Patent [19]

Eliachar et al.

[11] Patent Number: 5,438,793
[45] Date of Patent: * Aug. 8, 1995

[54] TREE CLIMBING DEVICE

[75] Inventors: Eliahu Eliachar, Haifa; Eliahu Mizrachi, Petach Tikva, both of Israel

[73] Assignee: Toptech Ltd., Haifa, Israel

[*] Notice: The portion of the term of this patent subsequent to Apr. 12, 2011 has been disclaimed.

[21] Appl. No.: 198,064

[22] Filed: Feb. 18, 1994

Related U.S. Application Data

[63] Continuation-in-part of Ser. No. 886,290, May 21, 1992, Pat. No. 5,301,459.

[30] Foreign Application Priority Data

Jun. 2, 1991 [IL] Israel ............................................ 98335

[51] Int. Cl.[6] ................................................. B27L 1/00
[52] U.S. Cl. ................................................... 47/1.01
[58] Field of Search ...................... 144/208 K; 47/1 B

[56] References Cited

U.S. PATENT DOCUMENTS

| | | | |
|---|---|---|---|
| 2,477,922 | 8/1949 | Emery | 47/1 B |
| 2,534,595 | 12/1950 | Hamilton | 47/1 B |
| 2,541,767 | 2/1951 | Jones | 47/1 B |
| 2,612,724 | 10/1952 | Llewellyn | 47/1 B |
| 4,735,244 | 4/1988 | Kacer | 47/1 B |
| 5,056,258 | 10/1991 | Quinn | 47/1 B |

*Primary Examiner*—Henry E. Raduazo
*Attorney, Agent, or Firm*—Lowe, Price, LeBlanc & Becker

[57] ABSTRACT

A device for climbing a vertical member such as a tree and pole, has an upper engagement member and a lower engagement member which can be opened or closed to respectively engage an upper and lower portion of the vertical member. At least one extension/retraction member is connected to the upper and lower engagement members. The extension/retraction member extends or retracts to vary the distance between the upper and lower engagement members. During the extension and retraction of the extension/retraction member either the upper or lower engagement member is open and the other engagement member is closed. The device may also include a controller and power source. The center of mass of upper and lower engagement members and the extension/retraction members substantially coincides with the location of the vertical member.

21 Claims, 13 Drawing Sheets

TREE CLIMBING DEVICE

RELATED APPLICATIONS

This application is a Continuation-in-Part of application Ser. No. 07/886,290 filed May 21, 1992, now U.S. Pat. No. 5,301,459 on which a Notice of Allowance was issued on Sep. 29, 1993 and the issue fee paid on Dec. 28, 1993.

TECHNICAL FIELD

The present invention relates to a device for climbing up trees and for maintenance of trees having trunks which do not branch out but rather have a single stem, such as palm trees or coconut trees.

BACKGROUND ART

The technology available for climbing up trees for purposes of their maintenance consists of lifting a worker to the working site. For this purpose hydraulic devices are used. The devices vary in their capacity to lift the worker to varying heights and ground structure transferability. The price of these devices varies according to their capabilities and safety characteristics. The higher a device can lift, the higher its price will be.

In the palm tree plantation today many kinds of man lifting devices are used to do the work at the tree top. These devices are the same as those used in such sites as construction sites, electric company working sites, local municipality sites and others.

The devices operating today in palm tree plantations include: EFRON—a small device for lifting a person to various heights up to 15 meters, MANITO—a medium size device for lifting a person to heights up to 15 meters, MARK LIFT—large devices for sites up to 20 meters high. The two last devices mentioned are very expensive and their operation is very slow. The slow work pace is one of the problems that the palm tree growers have to deal with. In working on plantations there are quite a few tasks that have to do done quickly or else insufficient amounts of fruit will be gathered. The devices common today are slow and are too expensive to make it possible to purchase several devices. Most palm tree growers cannot afford to buy the expensive devices, so when a tree reaches the height of the maximum capability of the device that they can afford, the tree is cut down and replaced by a new young tree that will yield its first fruit only seven years later. The amount of fruit yielded by palm trees is in close correlation with their heights. Thus just when the tree is cut down it has the potential for yielding its best crop. The risk of lifting a person to this height is very great and so the lifting devices get to be large and expensive and the growers cannot afford them. Another problem of the large devices in the plantation is their weight which does considerable damage to the ground—packing the ground, a problem from which agriculture suffers a great deal.

The present invention relates to a device that may replace the common technology used today especially for palm plantations and the like and which is based on a new conception of the task at hand—control from the ground by remote control. The device can rise to any desired height without risk to a person or damage to the ground. The price of the proposed device can be low enough for the growers to afford, and thus they will be able to buy several devices at a much lower price than that of one of the common devices used today. The device according to the present invention will be able to do the work faster, cheaper and much more safely for a much lower price.

It is therefore an object of the present invention to provide a device for climbing trees, poles and other vertical members which is easy to erect in the field, inexpensive, safe to operate and can speed maintenance and other operations.

It is a further object of the present invention to provide a climbing device which has a center of mass which approximately coincides with a longitudinal axis of the vertical member being climbed.

It is a still further object of the present invention to provide a device which is particularly adapted to engage a vertical member which does not have a smooth or straight surface.

It is another object of the present invention to provide a device of which maintains engagement with the member being climbed throughout the climbing operation.

It is a yet another object of the invention to provide a climbing device that includes a moveable working platform or cart which can circle the climbed member to facilitate work being performed.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

A device for climbing vertical members has upper and lower engagement units which can be open and closed. In the closed position the engagement units respectively engage upper and lower portions of the vertical member. At least one extension/retraction unit is connected to the upper and lower engagement units. Each extension/retraction units can be extended or retracted to vary the distance between the upper and said lower engagement units. During extension or retraction either the upper or lower engagement units are in and open position and the other of engagement units are in the closed position.

A controller may be provided for controlling the extension and retraction of each extension/retraction unit. The controller can initiate the consecutive opening of either the upper or lower engagement units, the extension or retraction of each extension/retraction unit, and the closing of the opened engagement unit after the extension or retraction has been completed. The controller may include a portable programmable commanding module for use by an operator to enter commands to initiate control.

A power source may also be operatively connected to the engagement units and each extension/retraction unit. The power source is located at ground or floor level and connected to the engagement and extension/retraction units by a flexible hose or cable. The power source can be hydraulic, pneumatic or electrical.

In accordance with one aspect of the invention, the extension/retraction, upper engagement and lower engagement units respectively include at least one cylinder operatively connected to the power source. At least one cylinder opens and closes each of the upper engagement unit and the lower engagement unit, respectively. At least one cylinder extends and retracts the extension/retraction unit(s). The upper and lower engagement units may also each include one or more springs for closing at least one of the upper and lower engagement units in the event of a power source outage.

In a further embodiment of the invention, two extension/retraction mechanisms and an upper and lower pair of opposed engagement mechanisms are provided. One engagement mechanism of each pair is connected to one extension/retraction mechanism and the other engagement mechanism of each pair is connected to the other extension/retraction mechanism. A lateral support member is fixably mounted to and between each pair of opposed engagement mechanisms. The lateral support member is disposed substantial orthogonal to a longitudinal axis of at least one of the extension/retraction mechanisms and provides lateral support to the extension/retraction mechanisms.

According to further aspects of the invention, each engagement mechanism includes an engaging member which contacts the vertical member when the engagement mechanisms are in the closed position. Preferably each engaging member is rotatable about an axis in a plane substantially orthogonal to a longitudinal axis of the extension/retraction mechanism to which the applicable engagement mechanism is connected. It is also preferred that the engaging member be "V" shaped, although other shapes may be satisfactory for specific applications.

The engagement and extension/retraction mechanisms may be beneficially arranged so as to have a center of mass or weight substantially equal distance from a longitudinal axis of each the extension/retraction mechanisms. If desired, the lateral support member can also be arranged so as to maintain a center of mass substantially equal distance from a longitudinal axis of each said extension/retraction mechanisms.

According to further aspects of the invention a track, having two sections disposed above the upper engagement mechanisms, is also provided. Each section of the track is rotatable between open and closed positions in a plane substantially orthogonal to the longitudinal axis at least of one extension/retraction mechanism. In the closed position the track forms a circle in the above mentioned plane and is supported from each of the upper engagement mechanisms and the lateral support member which is connected to them. The track is preferably "[" shaped. A platform can be movably mounted to the track and may include a plurality of wheels which contact the track. The platform can also be connected to the power source and controlled by the controller. In this manner, the movement of the platform on the track can be initiated by an operator on the ground using the commanding module. Movement may be initiated by the command module.

In accordance with a further embodiment of the invention a device for climbing up a tree having at least one trunk which does not branch out and have a single stem, and for the maintenance thereof is provided. The device includes a power source located at ground level. The climbing unit has (i) at least two pairs of arms, (ii) mechanisms respectively associated with the pairs of arms to selectively open and close the arms around the trunk of the tree and (iii) a distance varying arrangement operatively interconnected to said mechanisms for varying a distance between the at least two pairs of arms. Also included is a work production unit operatively connected to and positioned on the climbing unit. The work production unit has a base and means connected thereto for performing a selected work function in the maintenance of the tree. The power source is operatively connected to the climbing unit and the work production unit preferably by means of a flexible hydraulic or pneumatic hose. A controller, operatively connected to the climbing unit and work production unit, translates commands, inputted through a control box operated by an operator on the ground, to the climbing unit and work production unit. The commands respectively initiate operation of the mechanisms, distance varying arrangement and/or work production unit.

The present invention relates to a device particularly suitable for ascending and maintaining trees having trunks which do not branch out but rather have a single stem such as palm trees or coconut trees.

The preferred power source is an hydraulic or pneumatic source located at ground or floor level.

In the above described embodiments, the climbing unit or device operatively connected to the power source and a programmable controller (PLC). The means for opening and closing said arms or engagement mechanisms and for varying the distance between the two pairs of arms or engagement mechanisms are preferably cylinders operatively connected to the power source wherein one cylinder serves for opening and closing each pair of arms or engagement mechanisms and one or more cylinders serve for varying the distance between the two pairs of arms or engagement mechanisms.

The programmable controller (PLC) translates the commands to the climbing unit and to the production unit given through a control box manually operated by the operator on the ground.

The ascent or descent of the devices on the trunk pole or other vertical member is brought about by locking the first pair of arms or engagement mechanisms around the trunk and distancing the second pair of arms or engagement mechanisms and their consecutively locking said second pair and unlocking the first pair and distancing it.

For safety purposes the two pairs of arms or engagement mechanisms in the climbing unit can be simultaneously opened only by pressing a special button on the device itself and not by any button in the control box in the operator's hand. Furthermore, for safety purposes the two pairs of arms or engagement mechanisms are closed simultaneously around the stem by the force exerted by springs in the case of any engine failure.

The work production unit or moveable platform can be operatively connected to a controller positioned on the climbing unit or device, and may preferably have a circular base and means, for example, for maintenance of the trees. The circular base is preferably comprised of a circular track with an "I" or "[" profile that opens around one or more axis and which has a toothed band on it. The means for maintenance of the trees located in the work production unit may include:

a multi functional cart or platform attached to the track using preferably a hydraulic or pneumatic engine to move around the trunk as desired by the operator wherein said cart's or platform's engine has a gear that fits in the toothed band and wherein the cart or platform is supported by multiple wheels. In one embodiment four wheels are used with two on each side of the track;

and a harvesting unit or pruning unit or fertilizing unit or fruit supporting unit or any other unit for caring for trees wherein the unit is located on the multi functional cart or platform.

The pruning unit is preferably comprised of a rotating disk connected to an hydraulic or pneumatic engine.

The fertilizing unit preferably includes a powdering element with a hydraulic fan creating a flow of air through a Venturi pipe combining air and powder flow.

The fruit supporting unit preferably includes a ring which supports the entire tree top, branches and fruit.

The harvesting unit preferably includes a round platform holding the bunch of fruit that is cut down.

Before going out to the plantation there are a few preparations to be made according to the function that the device is expected to perform (can be done in the field), for example, installing the fertilizing unit or the harvesting unit. The device is transported to the field on a transport vehicle. At the field the device can be moved manually or by using a cart or supporting wheels.

Standing close to the stem while the device is climbing is forbidden by all means. A falling branch may cause severe injury especially a palm branch with its thorns. While the device is at work a distance should be kept from the stem also because a technical failure may occur. The device is planned to deal with technical problems in order to avoid accidents as much as possible.

An engine failure when the device is at work can happen. In this case no matter where the device is at this moment at least one of the two pairs of arms or engagement mechanisms should close immediately around the stem to avoid an accident. The two pairs of arms or engagement mechanisms are "normally closed" by spring force. In order to open the arms mechanisms, hydraulic or pneumatic pressure is typically needed. An alarm system may also be connected to the device to notify the operator of fuel shortage.

The climbing sequence is typically controlled by the programmable controller, to avoid a step being taken before its time which may cause an accident. There is a feedback unit to make sure that this will not happen.

The command to open both pairs of arms or engagement mechanisms simultaneously cannot be given through the control box to avoid a situation in which the arms will open above the ground.

This command is only given in order to put the device around the stem or other vertical member or to take the device off the stem or other vertical member. The switch that gives the system the order to do this function may be on the device itself, in which case, in order to use this switch the device has to be on the ground.

The device according to the preferred embodiments of the invention will be illustrated and clarified by the following figures. These figures are in no way meant to limit the scope of the present invention but serve only for clarification and illustration.

DETAILED DESCRIPTION OF THE FIGURES

Figure 1:
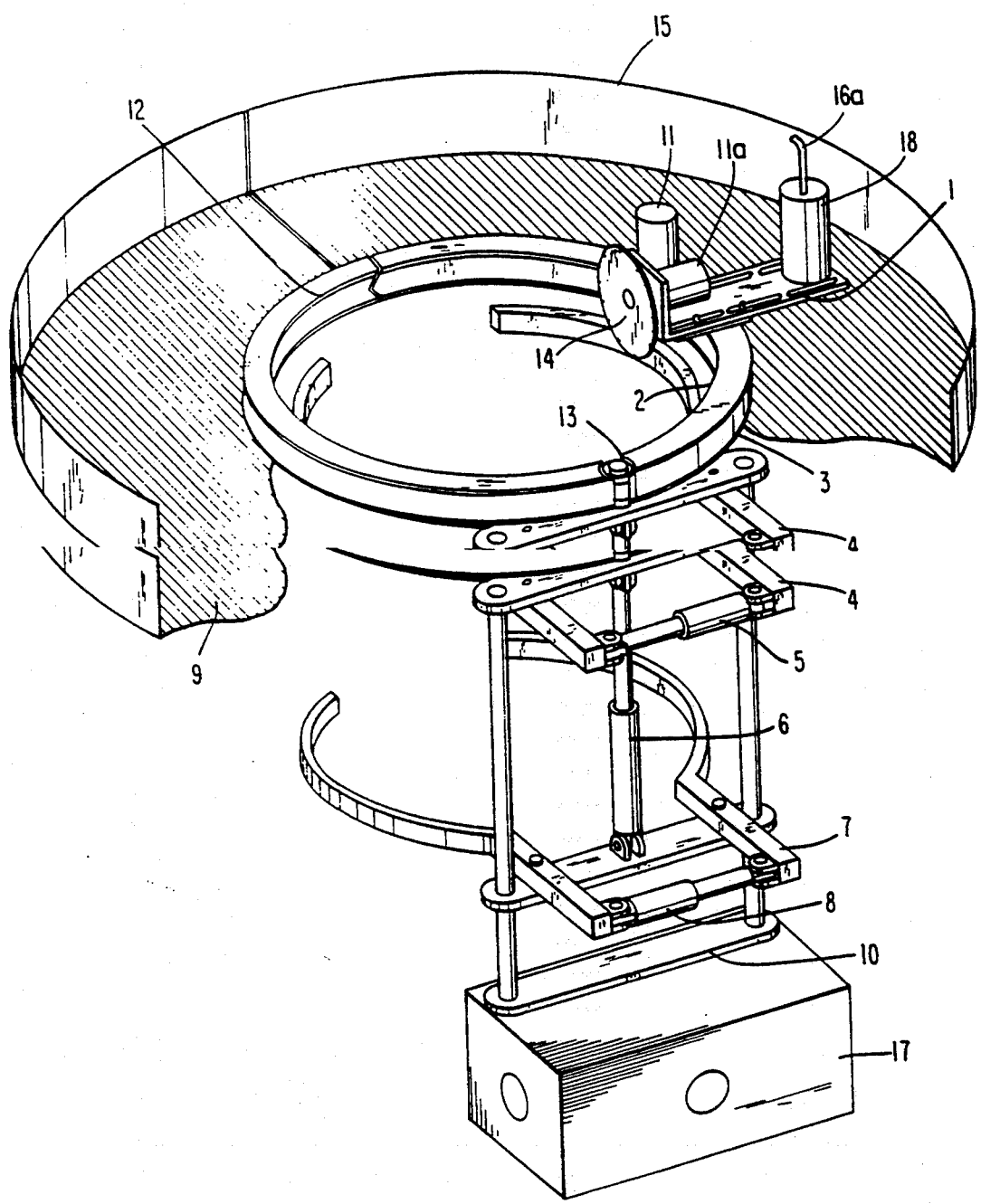
FIG. 1 represents a perspective view of the device.

FIG. 1 illustrates a perspective view of the device. Said device is brought to the stem. Then in order to open the two pairs of arms (4) and (7) simultaneously, the hydraulic engine (17) must be turned on in order to supply hydraulic pressure to the cylinders (5) and (8). The command to open the two pairs of arms simultaneously is given using a switch on the device.

The upper track (2,3) must be opened around the axis (13). at this point the device is placed around the stem and the track is locked by hand around it. The arms are locked around the stem by means of a command using the switch on the device. The device is now ready to climb the tree. Using the control box the operator commands the device to perform its function. When the command to climb is given, the device will perform a working sequence using its arms (4) and (7) and its cylinders (5), (6) and (8). The operator can order a climb up or down only when the means for maintenance of the tree such as harvesting, pruning or fertilizing units are at rest.

At a given interval from the moment that the operator stops the climb command, the device locks itself in order to perform its desired function. At the completion of the desired function the device is brought down, by using the down command on the control box. The track (2) (3) is then opened by hand, the arms (4) and (7) are opened using the switch on the device and the device can now be transferred to the next tree.

The climbing sequence is controlled by the programmable controller (PLC) located in the power source box. The operator has only to choose the desired destination up or down on the control box.

After the device has been placed around the stems the arms (4) and (7) lock around the stem at the specified pressure supplied by the hydraulic power unit (plus spring force).

At the "up" command:

(1) The upper pair of arms (4) open by supplied hydraulic pressure to cylinder (5).
(2) Hydraulic pressure is supplied to cylinder (6) till it extends to its end ( the whole device will rise).
(3) The pair of arms (4) close around the stem.
(4) The pair of arms (7) open by supplied hydraulic pressure to cylinder (8).
(5) Cylinder (6) decreases to its end.
(6) Pair of arms (7) close.
(7) The whole sequence starts over again.

The "down" command will use the same sequence in the opposite order.

When ascent stops, at the operator's command, the device locks around the stem waiting for the next order.

The work production unit is based on a circular track (3) that opens around axis (13) in order to mount the tree. On the track there is a toothed band (2). A multi-function cart (1) is attached to the track using a hydraulic engine (11) to move around, back and forth, as desired by the operator. The cart's engine (11) has a gear that fits in the toothed band, and this enables the cart to move around. The track is made on an "I" profile in order to accommodate, to support and to guide the cart's wheels. The cart is supported by four wheels—two from each side of the track. Said cart is the base for attaching the pruning unit, and the fertilizing unit (which can be used also for powdering/spraying against pests) or any other desired unit.

This attachable device must be adjusted to the size of the tree (radial adjustment). In order to do that there is an adjustable base attached to the cart. The adjustment is accomplished by hand on the ground using the four screws at the top of the cart.

The pruning function is accomplished using a blade (14) that rotates at a very high speed. The disk is connected to the hydraulic engine (11a) which is connected to the cart (1).

In order to fertilize the palm tree the male tree's powder has to be applied to the female tree. The powdering device on the cart (16) uses a small hydraulic fan in order to create a flow of air through a Venturi pipe (16a), combining air and powder flow. The air carries the powder towards its destination. The powdering unit is connected only when powdering is required. This device or similar ones can also be used for pest control.

For harvesting a round platform (9) is connected around the track in order to hold the bunch of fruit that is cut down. The platform is of two parts, and allows opening the track without disconnecting it when moving the device from one tree to another. The platform (9) allows opening due to a difference in height between the two parts of the platform which allows one part to ride above the other when the track is opened.

The hydraulic power source unit (17) is made as simple as possible in order to supply the device needs to perform its functions, while combining line pressure checks devices in order to ensure that a function has been performed as ordered, for control purposes and safety.

A hydraulic pump which supplies the oil to the system is rotated at constant velocity (close). Using an engine connected on the device (17) the oil pressure in the system is maintained using a pressure valve. Cylinders (5) (6) and (8) are the cylinders used for climbing. They receive their oil supply through electrically controlled valves.

Cylinders (5) and (8) are the cylinders used to open and close the two pairs of arms, one cylinder for each pair. These cylinders (5) and (8) are controlled independently using two "two way valves", a pressure check device which sends an electric signal to the controller and a flow valve. When cylinders (5) and (8) are at a stationary state the pressure in their line is the systems pressure, but when one of the cylinders changes state the pressure in their line falls due to the flow valve, and a signal is sent to the controller until the pressure is built up again due to the cylinder reaching a halt, the stem or the open end.

When a signal is sent the next step will not be performed. Cylinder (6) is the lifting cylinder controlled through a "three position valve". This cylinder's work procedure differs from the work procedure of cylinders (5) and (8); it does not work only between end zones and may be commanded for partial movement as well through while climbing at a steady pace it works between end zones. In order for the controller to know that the cylinder has reached the end zone and the next step can be performed (while climbing) a pressure checks device similar to the one used for the arms is used.

The other oil consumers are the disk's hydraulic engine (11a), the cart's engine (11) and the blower's engine (16).

The disk's and the cart's engines are directional, and the blower's engine needs only a rotation in one direction.

The fruit supporting unit is based on a ring which is brought up the tree pushed by the device. The "support unit" supports the whole tree top, branches and fruit. The ring will stay at its place till harvesting time. Then it will be taken off the tree. Said ring is composed of two half circles that open around a mutual axis. At the other end they are connected by a male female connection locked with a pin. The pin can be pulled out in order to open the ring around its axis in order to be taken off the tree. The pin is pulled out from the ground using a previously connected rope. The ring structure has three poles at 120 deg. that press against the stem (under the ring) by spring force. One end of each pole is connected to the ring while the other end trails along the stem (going up). This end has a sharp ending that penetrates the tree when downward pressure is felt. The ring can only be pushed upward or opened in order to be brought down.

Figure 2:
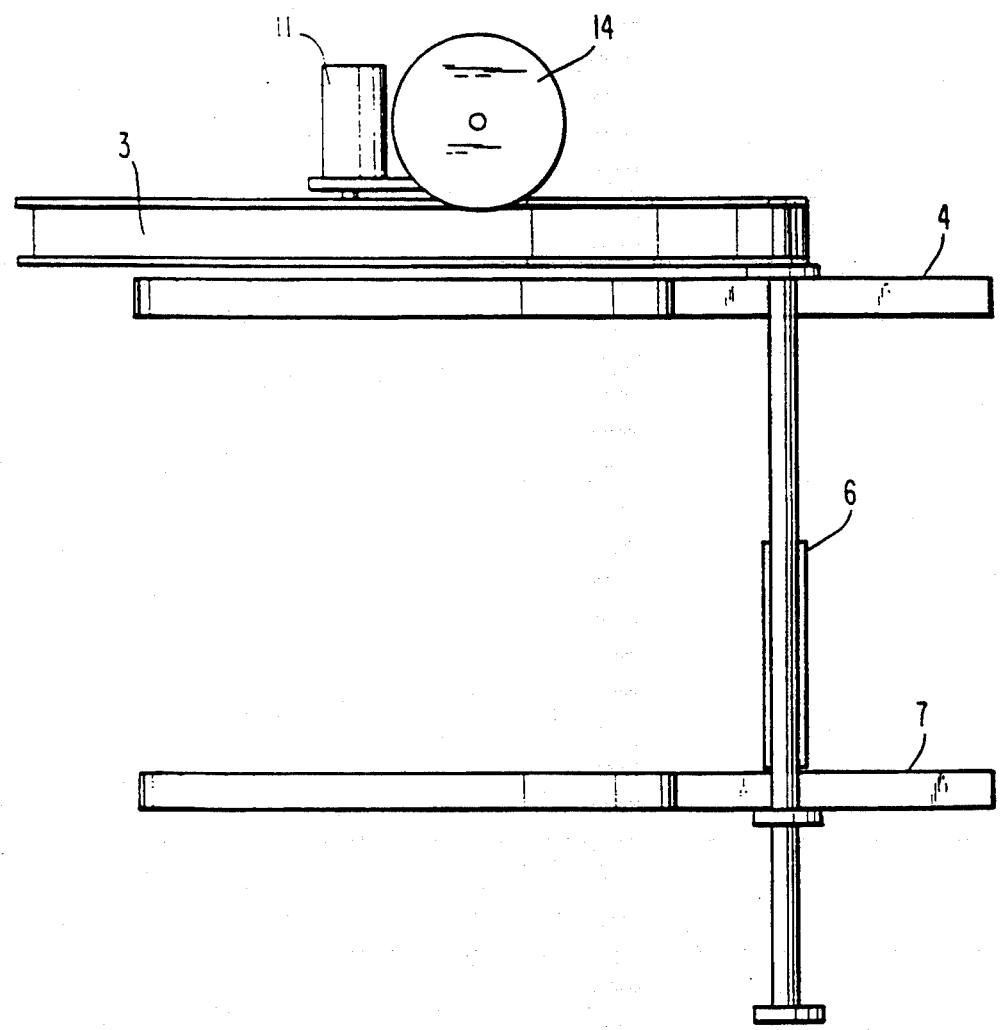
FIG. 2 represents a side view of the climbing unit and the work production unit (from the side of the arms).

FIG. 2 represents a side view of the climbing unit, and the work production unit (from the side of the arms), the two pairs of arms (4) and (7), the cylinder (6), the one in the climbing unit.

The rotating disk (14), the circular track (3) and the hydraulic engine (11) to move around the track are in the work production unit.

Figure 3:
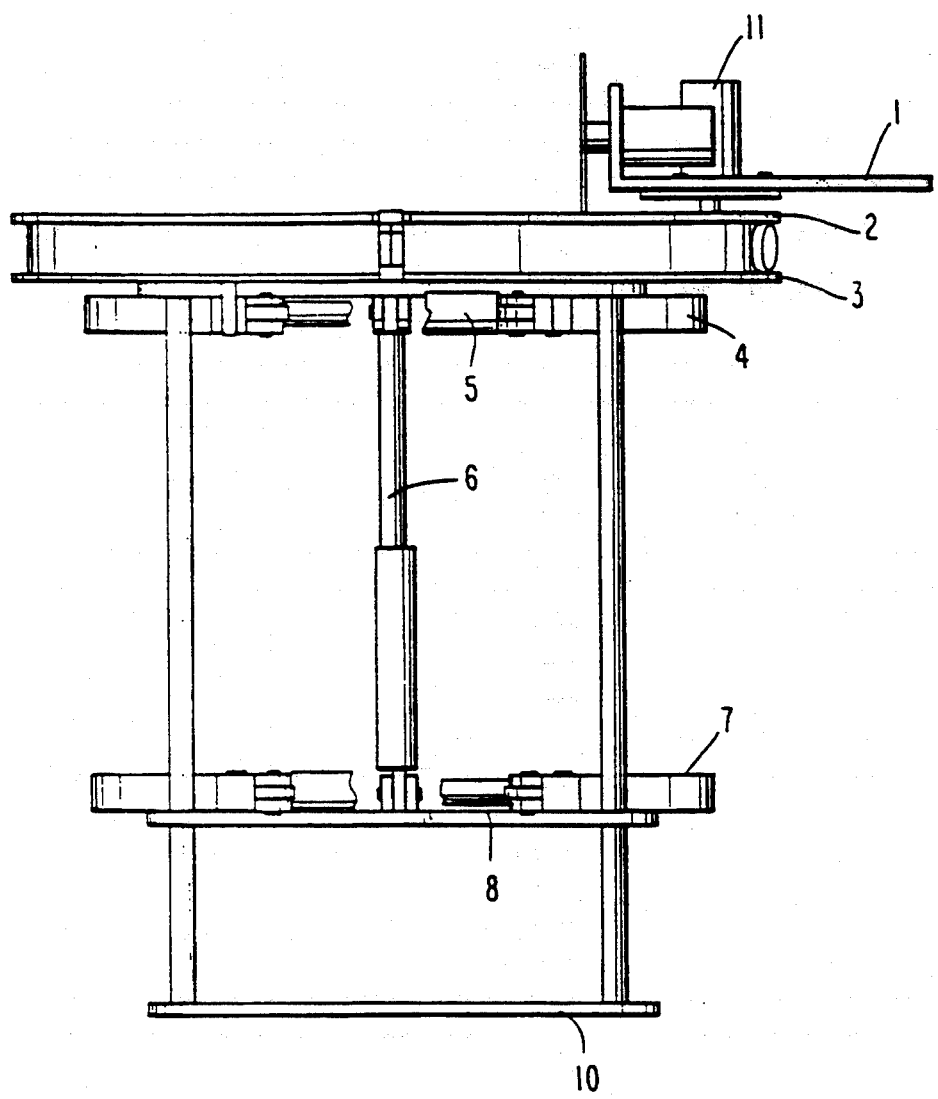
FIG. 3 represents a side view of the climbing unit and the work production unit from the rear.

FIG. 3 illustrates a side view of the climbing unit and the work production unit from the rear. The climbing unit is illustrated with the pair of arms (4) and (7) opened and closed by the hydraulic pressure of cylinder (5) and (8), and cylinder (6) for varying the distance between the two pairs of arms. The work production unit is illustrated with the circular track (3) and the toothed band (2) on it, and the multi-function cart (1) attached to the track using an hydraulic engine (11) to move around.

Figure 4:
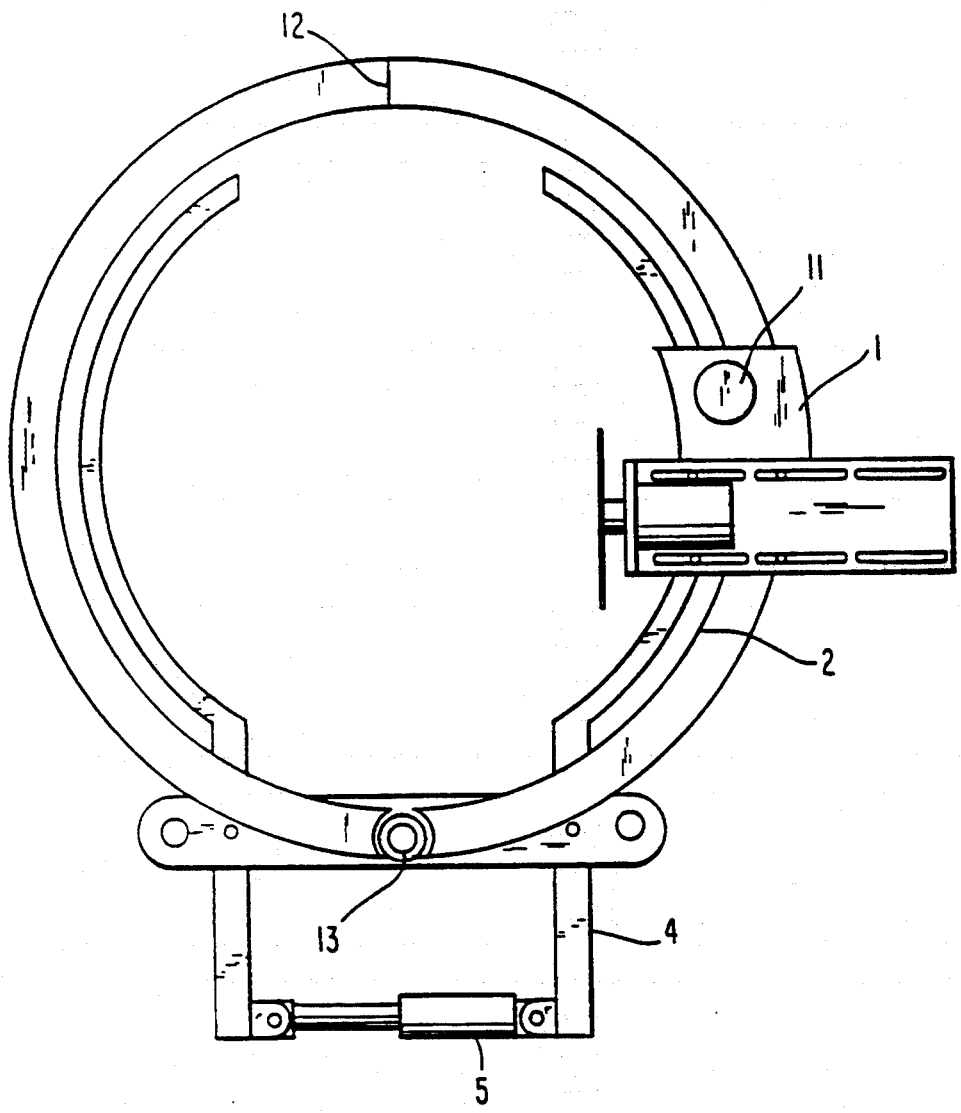
FIG. 4 represents a view from above of the work production unit and the climbing unit.

FIG. 4 illustrates a view from above of the climbing unit and the work production unit.

In the climbing unit the upper pair of arms (4) is opened and closed by cylinder (5).

The work production unit is illustrated by the toothed band (2) that can be opened at point (12) around the axis (13). A multi-function cart (1) is attached to the track using a hydraulic engine (11).

Figure 5A:
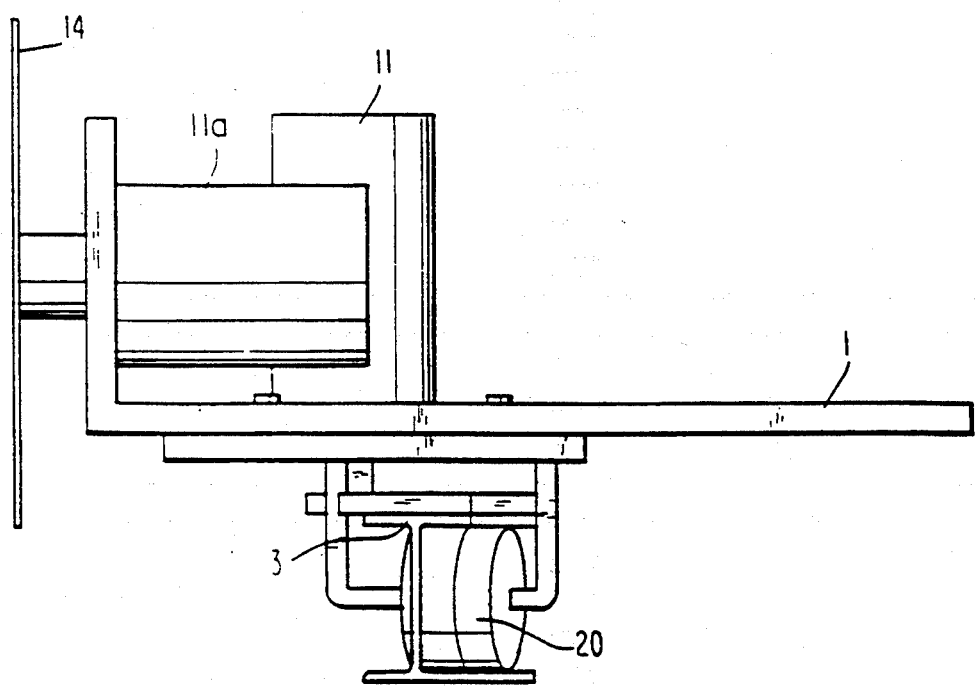
FIGS. 5a, 5b and 5c illustrate the work production unit.

FIG. 5a represents a side view of the work production unit comprised of a circular track (3) made of an "I" profile a multi-functional cart (1) attached to the track using a hydraulic engine (11) to move around. The cart is supported by wheels (20). The pruning unit comprises a disk (14) connected to an hydraulic engine (11a). The other hydraulic engine (11) enables the multi-function cart (1) to move around.

Figure 5B:
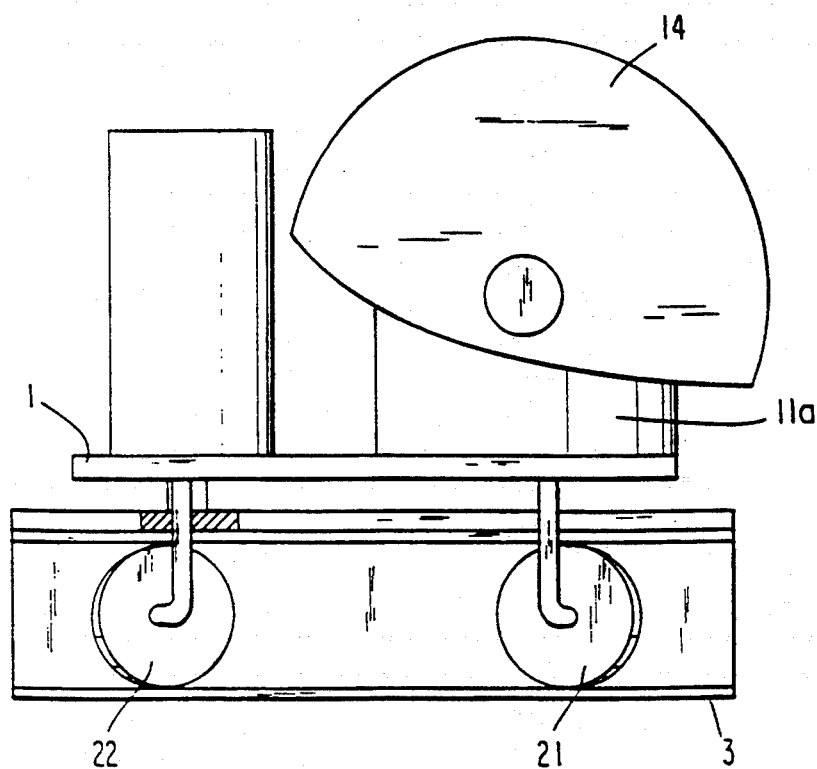

FIG. 5b illustrates another side view of the work production unit (from the center of the circular track).

The work production unit is represented by the circular track (3), a multi-function cart (1) made of an "I" profile. Said cart is supported by four wheels two (21) and (22) from each side of the track. The hydraulic engine (11) enables said cart to move around. The rotating disk (14) of the pruning unit is connected to an hydraulic engine (11a).

Figure 5C:
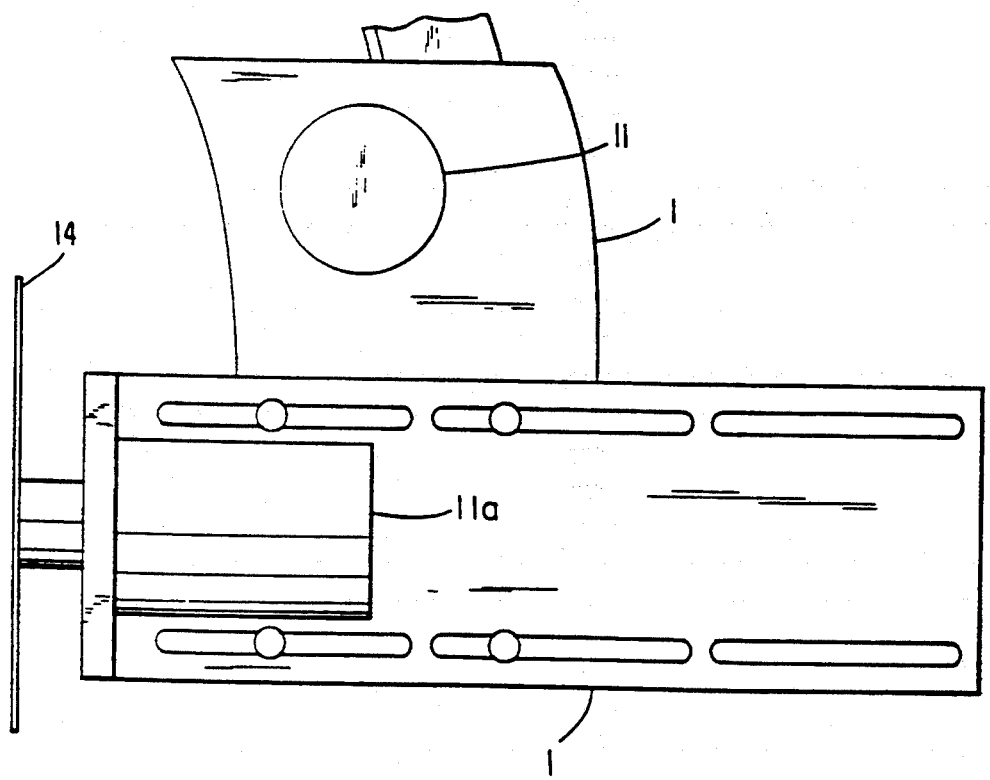

FIG. 5c illustrates a view from above of the pruning unit.

A multi-function cart (1) is attached to the track (3) using an hydraulic engine (11) to move around. The disk (14) of the pruning unit rotates at a very high speed. Said disk is connected to an hydraulic engine (11a) which is connected to the cart.

Figure 6:
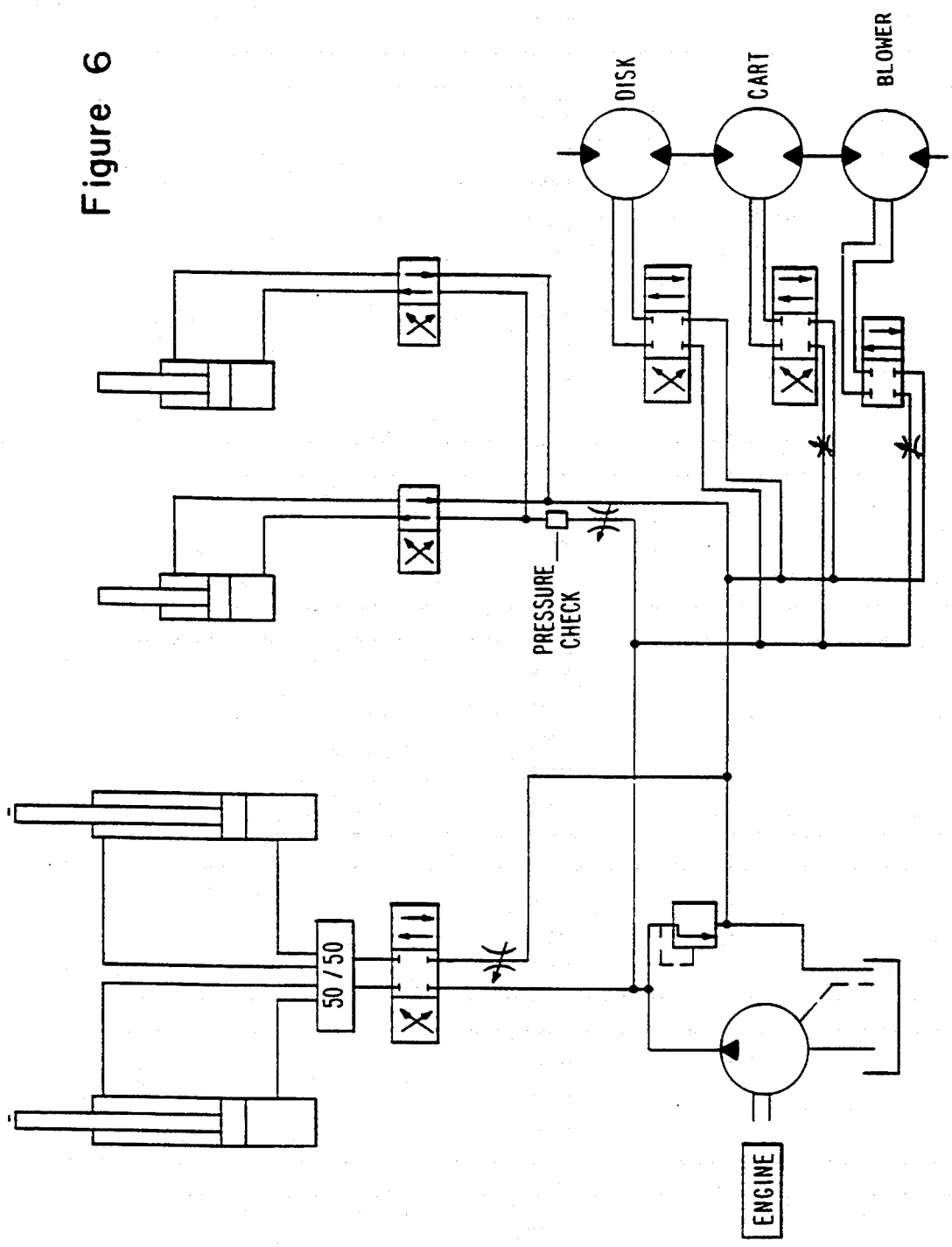
FIG. 6 represents from various sides the flow chart of the hydraulic power unit.

FIG. 6 represents a flow chart of the hydraulic power unit. An explanation of the hydraulic unit was provided above.

FIGS. 7-12 depict a further embodiment of the invention which is simpler to assemble and manufacture than the above described embodiments. The device which will be described in detail below, can be easily assembled, disassembled and changed in size and price, according to market demand. Stability is improved because the center of mass or weight of the machine has been moved closer to the center of the vertical member being climbed. Additionally, because of the arrangement of the engaging mechanisms or arms, a constant distant can be maintained between the center of the device and the center of the member being climbed.

Figure 7:
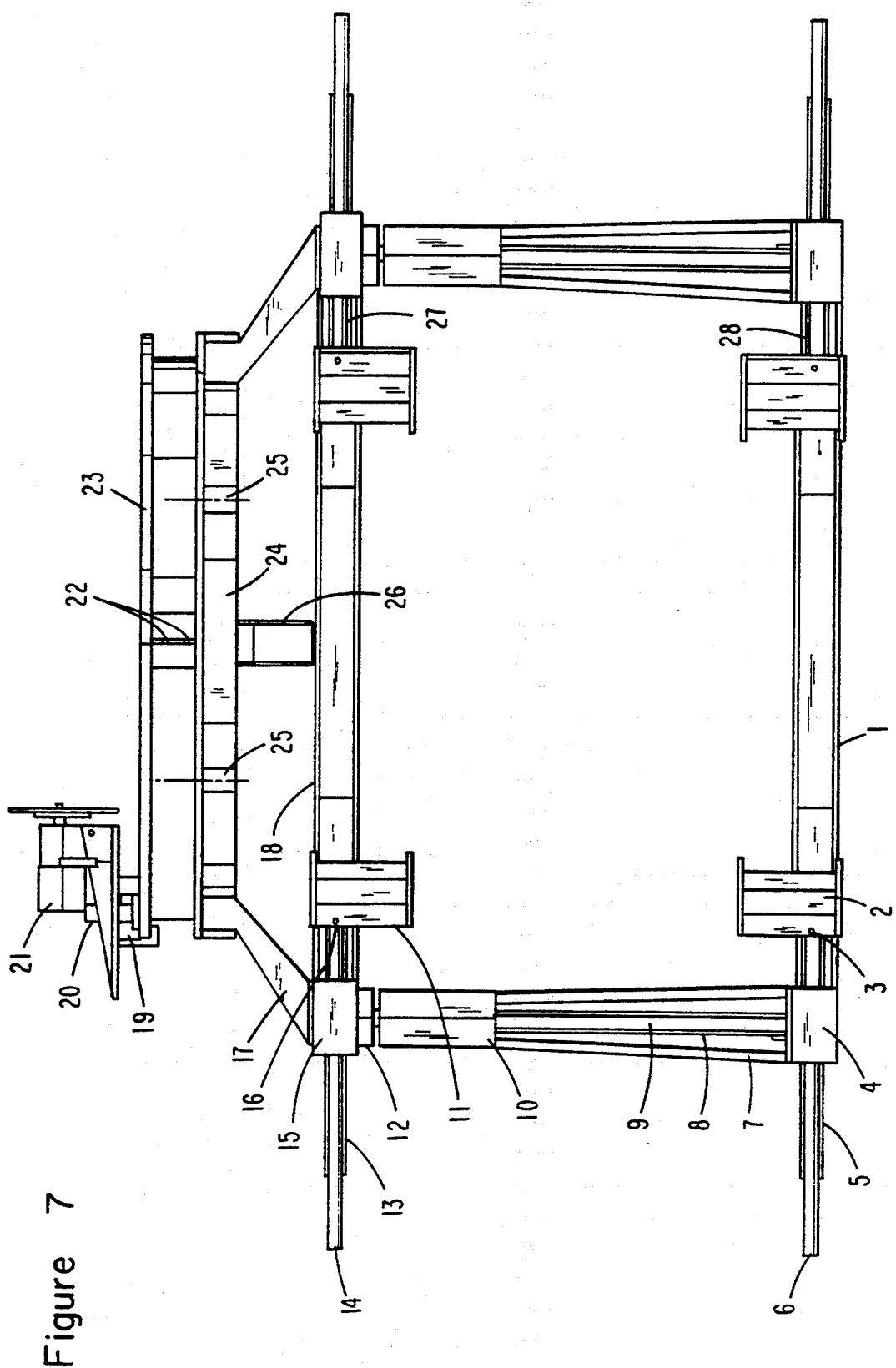
FIG. 7 is a front view of another embodiment of a climbing device in accordance with the present invention.
Figure 8:
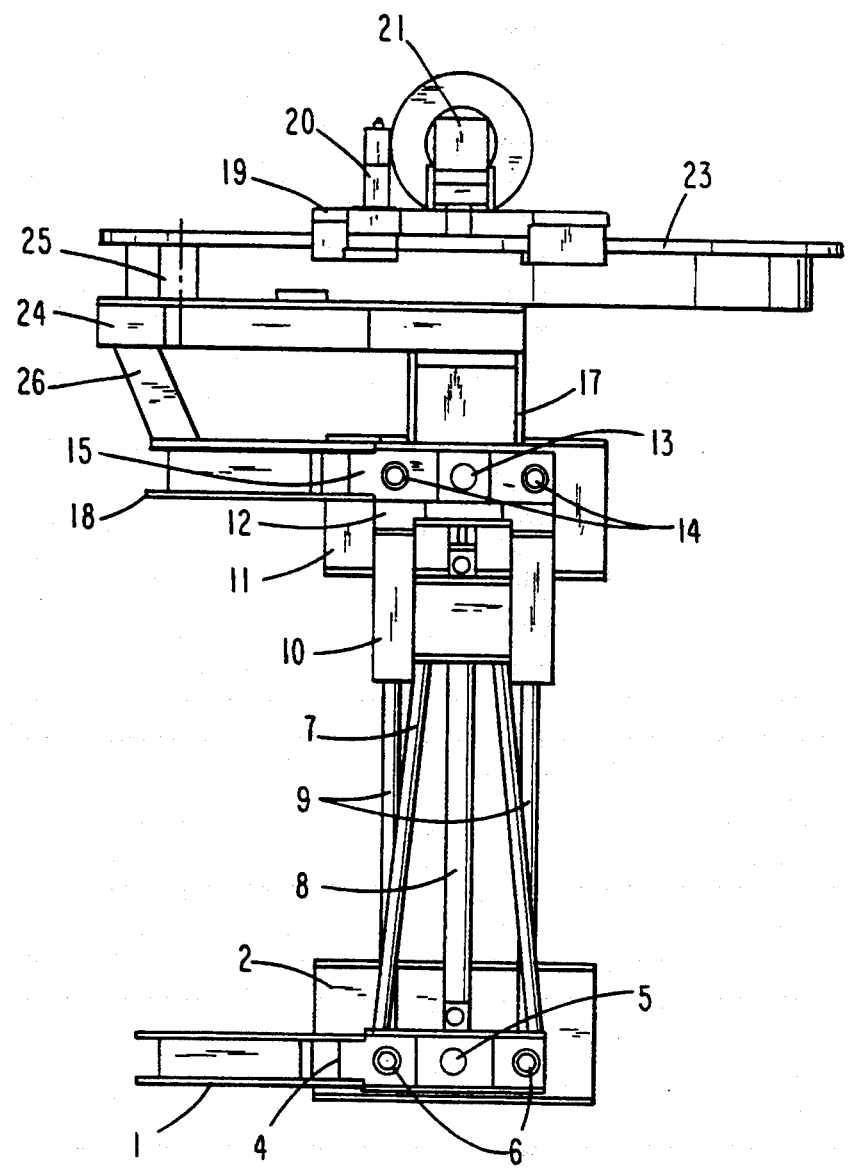
FIG. 8 is a side view of the FIG. 7 device.
Figure 9:
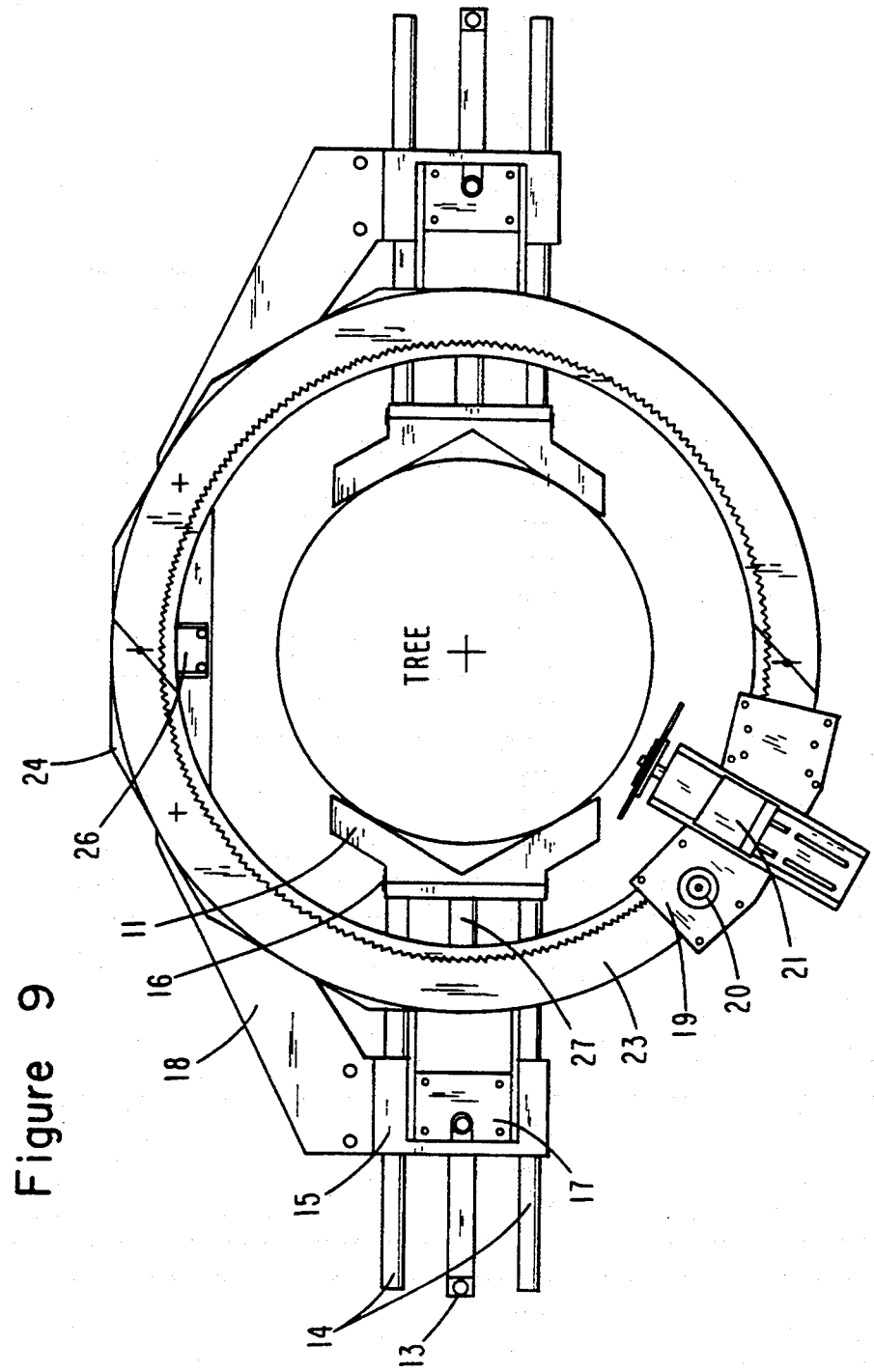
FIG. 9 is a top or plan view of the FIG. 7 device.

Two side structures or modules, that are mirror images of each other are shown in FIG. 7. Each of the side structures or modules has three hydraulic cylinders 5, 8 and 13 and linear followers 6, 9 and 14. As shown in FIGS. 8 and 9, there are two linear followers for each cylinder. Cylinder 8 is used to lengthen or shorten the structure, while cylinders 5 and 13 are used to close or open the fingers 2 and 11 through springs 27 and 28. The fingers 2 and 11 make contact with the tree trunk, pole or other vertical member, in order to hold the vertical member while the device is climbing or parked at a desired height.

Two main lateral support connections or bases 1 and 18 are connected between the modules. The modules are held in place facing each other in a stable condition by the bases. Different base lengths will accommodate various vertical member diameters.

Figure 10:
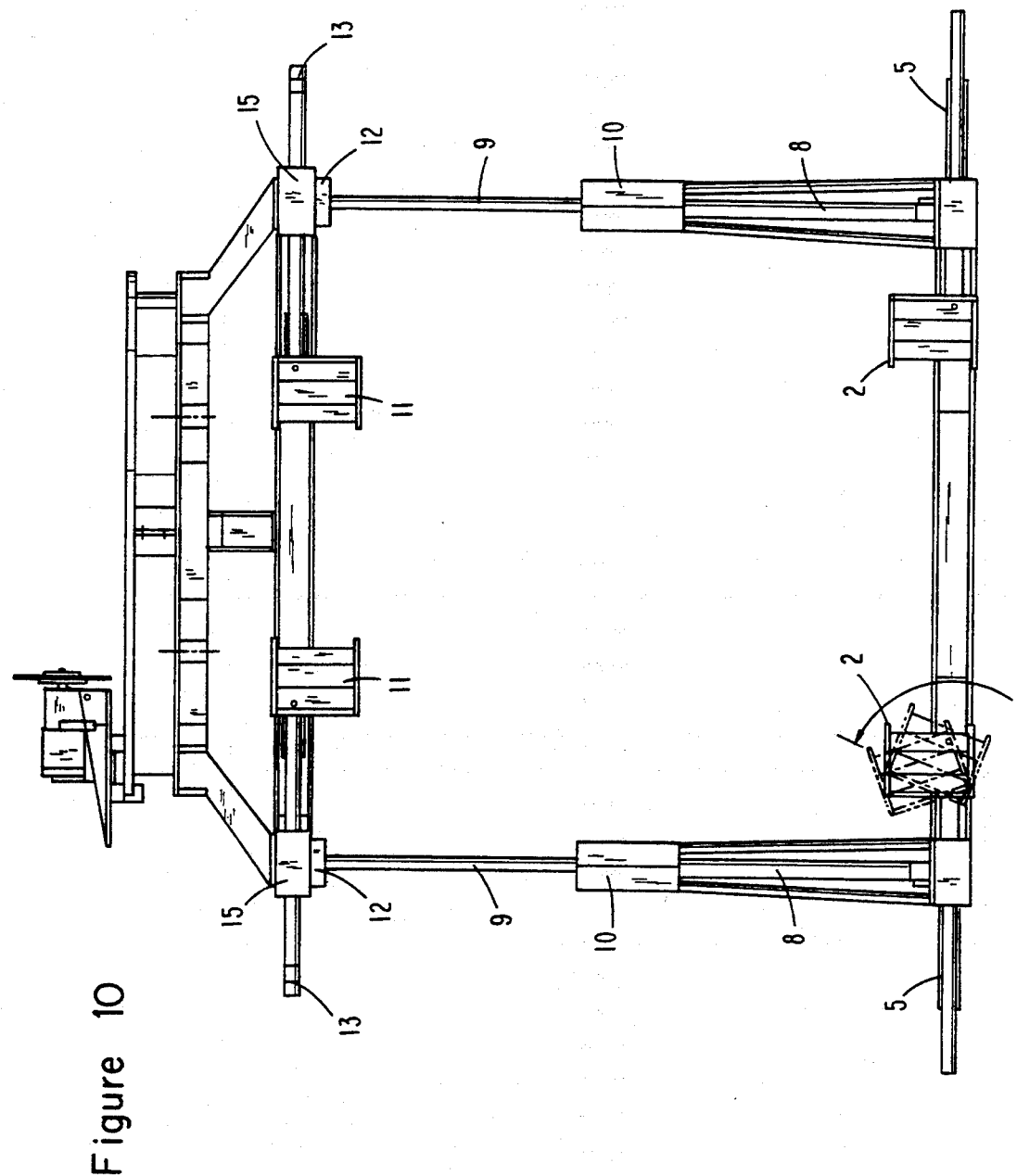
FIG. 10 is a front view of the FIG. 7 device during a climbing operation.

As shown in FIG. 9, the engagement or tree holding devices include fingers 2 and 11 that are designed in such a way that the modules are always centered around the vertical member when the fingers are closed. This is accomplished by the V-shaped or centering triangle design of the fingers. The fingers 2 and 11 are pressed by cylinders 5 and 13 toward the tree trunk through springs 27 and 28. The fingers, as shown in FIGS. 7, 9 and 10, are also arranged to be rotatable about horizontal pins 3 and 16 which enables the figures to make maximum contact with the vertical member outer surface. This is particularly beneficial when the contact surface of the vertical member is not smooth or is sloped.

As can be seen in FIG. 9, an upper base 24 serves as a base for the ring or track 23. The track can be utilized by a platform or cart 19 which can move around the track 23 to carry work production units such as cutting disk 21.

The climbing unit—including the two modules, the lateral support members 1 and 18, the springs 27 and 28 and the fingers 2 and 11—enable the device to climb the tree and be parked at a desired height. The upper base 24, track 23 and platform 19 enable the work production units to move radially around the vertical member. These later elements are all supported as seen in FIGS. 7 and 9, by support members 17 and 26. The two members 17 rigidly attach to a structural part 15 which houses a linear bearing. Support member 26 is rigidly attached to the center of the lateral support member 18.

The work production units, for example, the cutting disk 21, or any other unit needed to perform work on or about the vertical member at a particular height are supported by the platform 19.

Each module is a complete unit that can be transported and used in assembling the device in any number of sizes. Each module includes all of the components necessary to climb the vertical member including the extension/retraction cylinder 8 and the engagement cylinders 5 and 13. The linear followers 9 run parallel to the lengthening cylinder 8 and the linear followers 6 and 14 are parallel to engagement cylinders 5 and 13. In each case, there are two linear followers per cylinder.

As shown in FIG. 10, the cylinders 8 create the lengthening or extension of the device by distancing parts 12 and 15 from part 10. Poles 9 serve as the linear followers in the lengthening or extension process. The upper ends of poles 9 are rigidly attached to parts 12. Poles 9 move through and are guided by linear bearings in parts 10 thus enabling a smooth linear change in length of the device as cylinders 8 extend or retract.

Cylinders 5 and 13 create the movement of fingers 2 and 11 through the springs 27 and 28 toward and away from the vertical member. Poles 6 and 14 serve as linear followers to this movement. Ends of the poles 6 and 14 are connected to the fingers 2 and 11 by horizontal pins 3 and 16. This enables restricted vertical rotation of the fingers 2 and 11 which is beneficial in obtaining maximum contact with vertical members which have a rough, bumpy or incidentally slowed surface. Poles 6 and 14 slide through and are guided by linear bearings in parts 4 and 15 which enable the smooth linear movement to fingers 2 and 11 as shown in FIG. 7.

Members 7 rigidly connect parts 10 and 4 which hold the linear bearings for the respective engagement mechanisms. The cylinder 8 is connected to part 10 in such a way that when cylinder 8 lengthens, parts 12 and 14 are distanced from part 10. During this lengthening process, poles 9 move linearly through the bearings in part 10. As this movement occurs, the springs 27 and 28 in fingers 2 and 11 are vertically distanced from each other. The lateral support members 1 and 18 are connected to the modules in an opposing posture. Thus when connected by the members 1 and 18, the two modules face one another. The members 1 and 18 are respectively connected between the bearing holders 4 and 15. The bases are designed in a conventional manner to provide sufficient lateral stability when the fingers are in either the opened or closed positions, i.e. away from or engaged with the vertical member.

Figure 11:
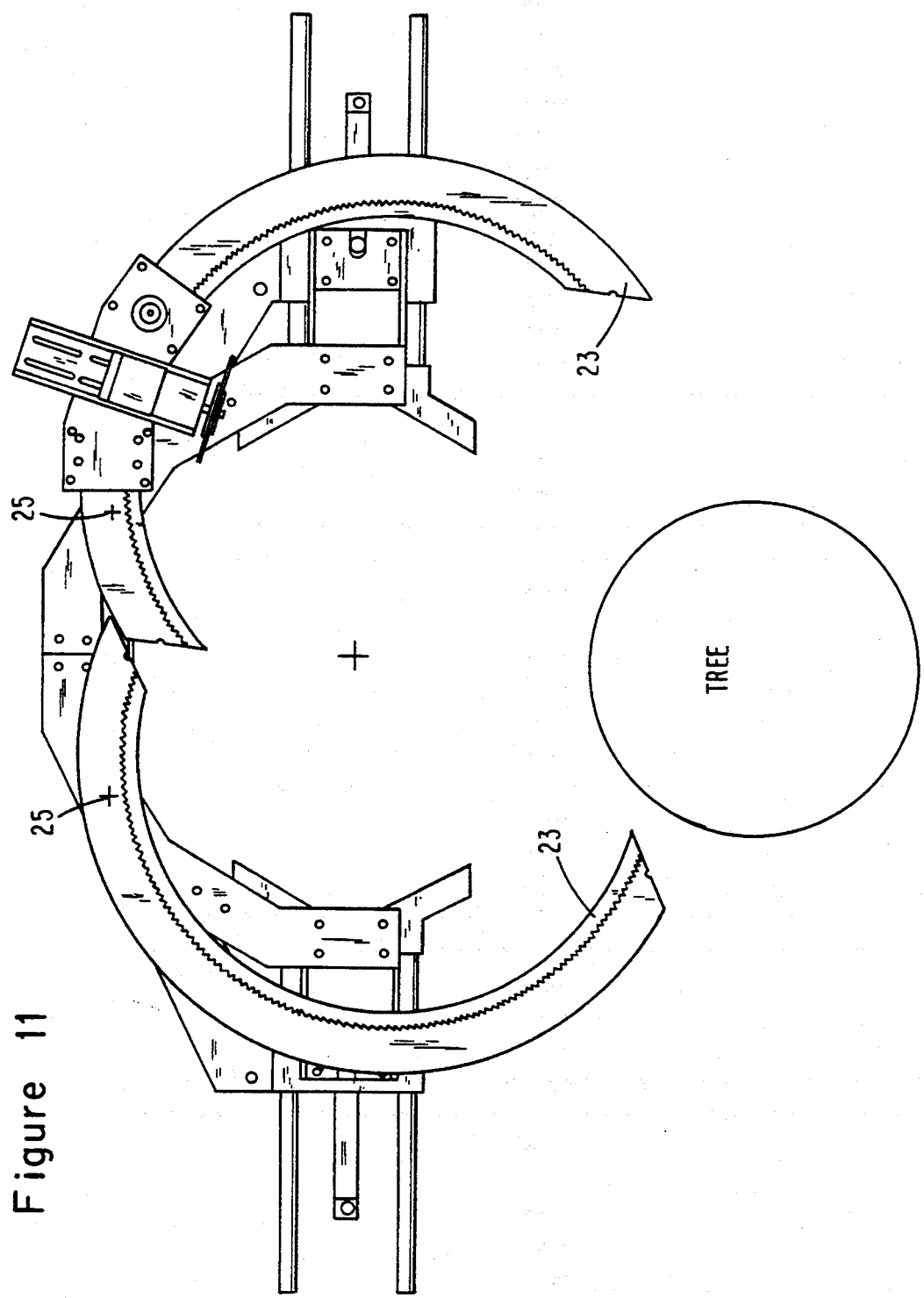
FIG. 11 is a top view of the FIG. 7 device with the circular track in an open position.

As shown in FIG. 11, the ring 23 is made in 2 parts or portions to enable it to rotate in a plane orthogonal to that of a vertical or longitudinal axis of the modules. When opened the ring can be placedd around the vertical member to be climbed. The track 23 connects to the upper base 24 by means of connections at the two axis 25. Thus each portion of the track rotates about an independent axis. When the track is closed a male-female connection 22 locks the track in position. In the locked position, the two portions of the track are at equal height and level with each other. The platform or cart 19 uses the track 23 as a rail to move radially around the tree. A motor 20 may be provided to propel the platform 19 to the desired location. A cutting disk 21 or other work unit can be attached to the platform 19.

To fit the device around a vertical member, it is typically first brought to the vertical member in a fall back position. The device is made as short as possible by the cylinders 8, and the fingers 2 and 11 are placed in a closed position so that they are as close as possible to the center of the circle formed by the track 23. The cylinders 5 and 13 are therefore made as long as possible.

The track 23 is then opened around its axis 25 after disengaging lock 22. Fingers 2 and 11 are placed in an open position, that is moved as far from the center of the circle formed by the closed track 23, as possible. Fingers 2 and 11 are moved by cylinders 5 and 13 which become shorter. The device is then pushed toward and around vertical member to be climbed. Fingers 2 and 11 are moved toward the vertical member until contact is made. Pressure is then applied through springs 27 and 28 to provide sufficient engagement of the fingers with the vertical member to provide stability. In this process the cylinders 5 and 13 will become longer. The track 23 is now closed and locked using locking connection 22.

As a climb-up order is given to the machine from a control box held by an operator, the machine will perform a sequence of climbing steps, as long as the operator is pressing the climber button. In particular, the fingers 11 will be opened and moved away from the vertical member by the cylinders 13. The cylinders 8 will extend to distance the base 18 and the other upper components at the top of the device, including the track and platform, from the base 1 until a maximum length is reached. The fingers 11 are then closed by cylinders 13 until contact is made. Pressure is applied to the fingers through springs 27 in order to obtain sufficient engagement between the fingers 11 and the vertical member for proceeding with the next step. The fingers 2 are now opened and moved away from the vertical member by cylinders 8 now retract and pull base 1 and the other lower components of the device up until a minimum length is reached. Next, fingers 2 are moved toward the vertical member by cylinders 5 to a closed position. When contact between fingers 2 and the vertical member is made, pressure is applied through springs 28 to obtain sufficient engagement between the fingers 2 and the vertical member. A full sequence of steps have now been completed and will begin again if further climbing is required.

To climb down the vertical member, a climb down order is given to the device from the control box held by the operator. The device will perform the climb down sequence as long as the operator is pressing the climb down button. In particular, fingers 2 are opened by cylinders 5 and moved away from the vertical member. The cylinders 8 can now extend pushing the lower portions of the device down until a maximum length is reached. The fingers 2 are now closed by the cylinders 5 until contact with the vertical member is made. Pressure is then applied through springs 28 to obtain satisfactory engagement between the fingers 2 and vertical member. Fingers 11 are next pulled back to an open position by cylinders 13. The cylinders 8 can now retract to pull the top portion of the device down until a minimum length is reached. Cylinders 13 move fingers 11 towards the vertical member until contact is made. Pressure is then applied to the fingers 11 through springs 27 to provide sufficient engagement between fingers 11 and the vertical member. This completes a full sequence of the climb down. The sequence can be performed again if further decent is necessary.

Figure 12:
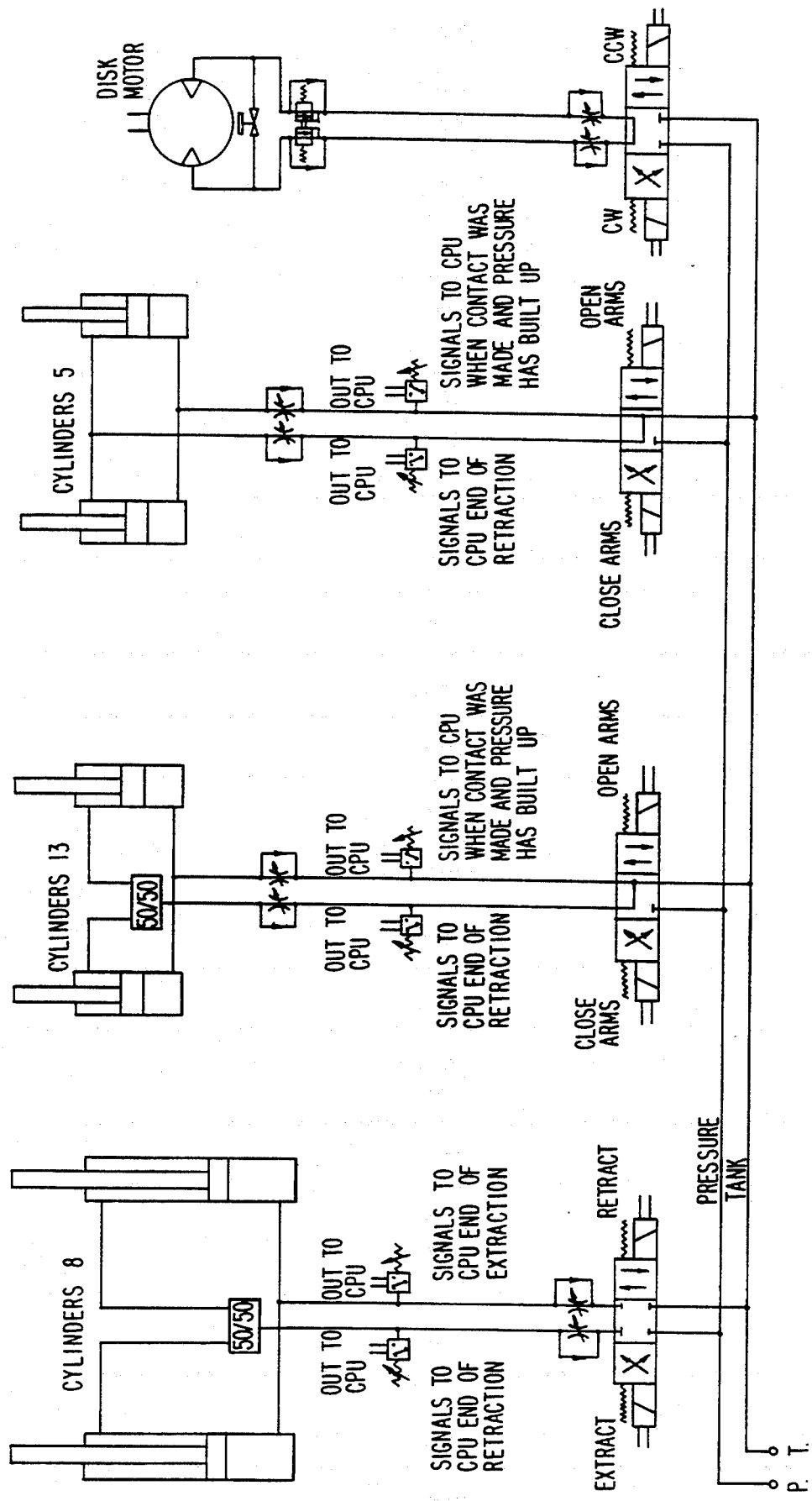
FIG. 12 is a schematic of an hydraulic circuit for use with the FIG. 7 device.

When the platform 19 reaches the desired height the climb up or climb down sequence is halted. The work production units are used to perform the desired task such as using cutting disk 21 to trim limbs of a tree. The work production units, as well as the movement of the platform 19, can also be controlled by the operator using the control box. It will be recognized that although hydraulic or pneumatic power are preferred, electrical power could be used to drive the cylinders and other components of the device. FIG. 12 is a schematic depiction of a hydraulic circuit which can be used in the control of the device of FIGS. 7–11. The circuit is of conventional design and will be easily understood by those skilled in the art without unnecessary description.

As described above, the present invention provides a device for climbing trees, poles or other vertical members which is easy to erect in the field, inexpensive, safe to operate and can speed maintenance and other operations. In accordance with described embodiments, the climbing device can have a center of mass which approximately coincides with the longitudinal axis of the vertical member being climbed. The device is particularly adapted to engage a vertical member which has a bumpy or sloped surface. During climbing operations, the device is always engaged with the vertical member being climbed. A moveable working platform is also provided which allows work to be safely performed at any location around the vertical member at a particular height.

What is claimed:

1. A device for climbing a vertical member comprising:
   upper engagement means for opening and closing into engagement with a first portion of said vertical member;
   lower engagement means for opening and closing into engagement with a second portion of said vertical member below said first portion;
   at least one extension/retraction means connected to said upper engagement means and said lower engagement means and for extending or retracting to vary the distance between said upper engagement means and said lower engagement means; and
   wherein one of said upper engagement means and lower engagement means is open and the other of said upper engagement means and lower engagement means is closed during the extension and retraction of said extension/retraction means.

2. A device according to claim 1, further comprising control means for controlling the extension and retraction of said extension/retraction means.

3. A device according to claim 2, wherein said control means initiates the consecutive opening of one of said upper engagement means or lower engagement means, extension or retraction of said extension/retraction means, and closing of said one of said upper engagement means or lower engagement means.

4. A device according to claim 1, further comprising a power source operatively connected to said upper engagement means and lower engagement means and said at least one extension/retraction means.

5. A device according to claim 4, wherein said power source is located at ground or floor level and is connected to said upper engagement means and lower engagement means and said at least one extension/retraction with a flexible hose or cable.

6. A device according to claim 4, wherein said power source is at least one of a hydraulic, pneumatic and electrical power source.

7. A device according to claim 4, wherein (i) said at least one extension/retraction means and each said upper engagement means and lower engagement means respectively include at least one cylinder operatively connected to said power source, and (ii) said at least one upper engagement means cylinder is operative in opening and closing said upper engagement means, said at least one lower engagement means cylinder is operative in opening and closing said lower engagement means, and said at least one extension/retraction means cylinder is operative in extending and retracting said at least one extension/retraction means.

8. A device according to claim 7, wherein each of said upper engagement means and lower engagement means respectively includes at least one spring for respectively closing at least one of said upper engagement means and lower engagement means in the event of a power source outage.

9. A device according to claim 1, wherein (i) said at least one extension/retraction means is comprised of two extension/retraction mechanisms and (ii) each of said upper engagement means and lower engagement means is comprised of a pair of opposed engagement mechanisms, one said engagement mechanism of each pair being connected to one said extension/retraction mechanism and the other said engagement mechanism of each pair being connected to the other said extension/retraction mechanism, and further comprising:
lateral support means mounted fixable to and between each said pair of opposed engagement mechanisms and disposed substantially orthogonal to a longitudinal axis of at least one of said two extension/retraction mechanisms for providing lateral support to said extension/retraction mechanisms.

10. A device according to claim 9, wherein each said engagement mechanism includes an engaging member for contacting said vertical member.

11. A device according to claim 10, wherein each said engagement member is rotatable about an axis in a plane substantially orthogonal to a longitudinal axis of the extension/retraction mechanism to which said engagement mechanism connected.

12. A device according to claim 10, wherein the said engaging member is "V" shaped.

13. A device according to claim 9, wherein the said engagement mechanisms and said extension/retraction mechanisms are arranged so as to have a center of mass substantially equal distant from a longitudinal axis of each said extension/retraction mechanisms.

14. A device according to claim 9, wherein the said engagement mechanisms, said extension/retraction mechanisms and said lateral support means are arranged so as to have a center of mass substantially equally distant from a longitudinal axis of each said extension/retraction mechanisms.

15. A device according to claim 9, further comprising a track having two sections disposed above said upper engagement mechanisms, wherein (i) each said section is rotatable between open and closed positions in a plane substantially orthogonal to the longitudinal axis of one of said extension/retraction mechanisms and (ii) in the closed position the track forms a circle in said plane and is supported from each of said upper engagement mechanisms and the lateral support member connected thereto.

16. A device according to claim 15, wherein said track is "[" shaped.

17. A device according to claim 15, further comprising a platform movably mounted to said track.

18. A device according to claim 17, wherein said platform includes a plurality of wheels in contact with said track.

19. A device according to claim 17, further comprising:
a power source operatively connected to said upper engagement means and lower engagement means, said at least one extension/retraction means and said platform;
control means for controlling the extension and retraction of said extension/retraction means and the movement of said platform on said track, wherein said control means includes a portable commanding module for entering commands to initiate control of the extension and retraction of said extension/retraction means and the movement of said platform on said track.

20. A device for climbing up a tree and for maintenance thereof, said tree having at least one trunk which does not branch out and has a single stem, comprising:
a power source located at ground level;
a climbing unit;
said climbing unit including at least two pairs of arms;
mechanisms respectively associated with said pairs for selectively opening and closing said arms around the trunk; and
a distance varying arrangement operatively interconnected to said mechanisms for varying a distance between said at least two pairs of arms;
a work production unit operatively connected to and positioned on the climbing unit, said work production unit including a base and means, connected to said base, for performing a selected work function in the maintenance of said tree; and
a controller, operatively connected to the climbing unit and work production unit, which translates the commands, inputted through a control box operated by an operator on the ground, to the climbing unit and to the work production unit to respectively initiate operation of said mechanisms and said distance varying arrangement and said work production unit;
wherein said power source is operatively connected to the climbing unit and the work production unit by means of a hydraulic or pneumatic hose.

21. A device for climbing a vertical member, comprising:
upper engagement unit operable for opening and to closing into engagement with an upper portion of said vertical member;

lower engagement unit operable for opening and closing into engagement with a lower portion of said vertical member;

at least one extension/retraction unit connected to said upper and lower engagement units and operable for extending or retracting to vary the distance between said upper and said lower engagement units; and wherein one of said upper and lower engagement units is open and the other of said upper and lower engagement units is closed during the extension and retraction of said at least one extension/retraction unit.

* * * * *